March 20, 1962 R. D. WELLES 3,026,141
UNDERSEAT COMPARTMENT
Filed Jan. 9, 1961 2 Sheets-Sheet 1
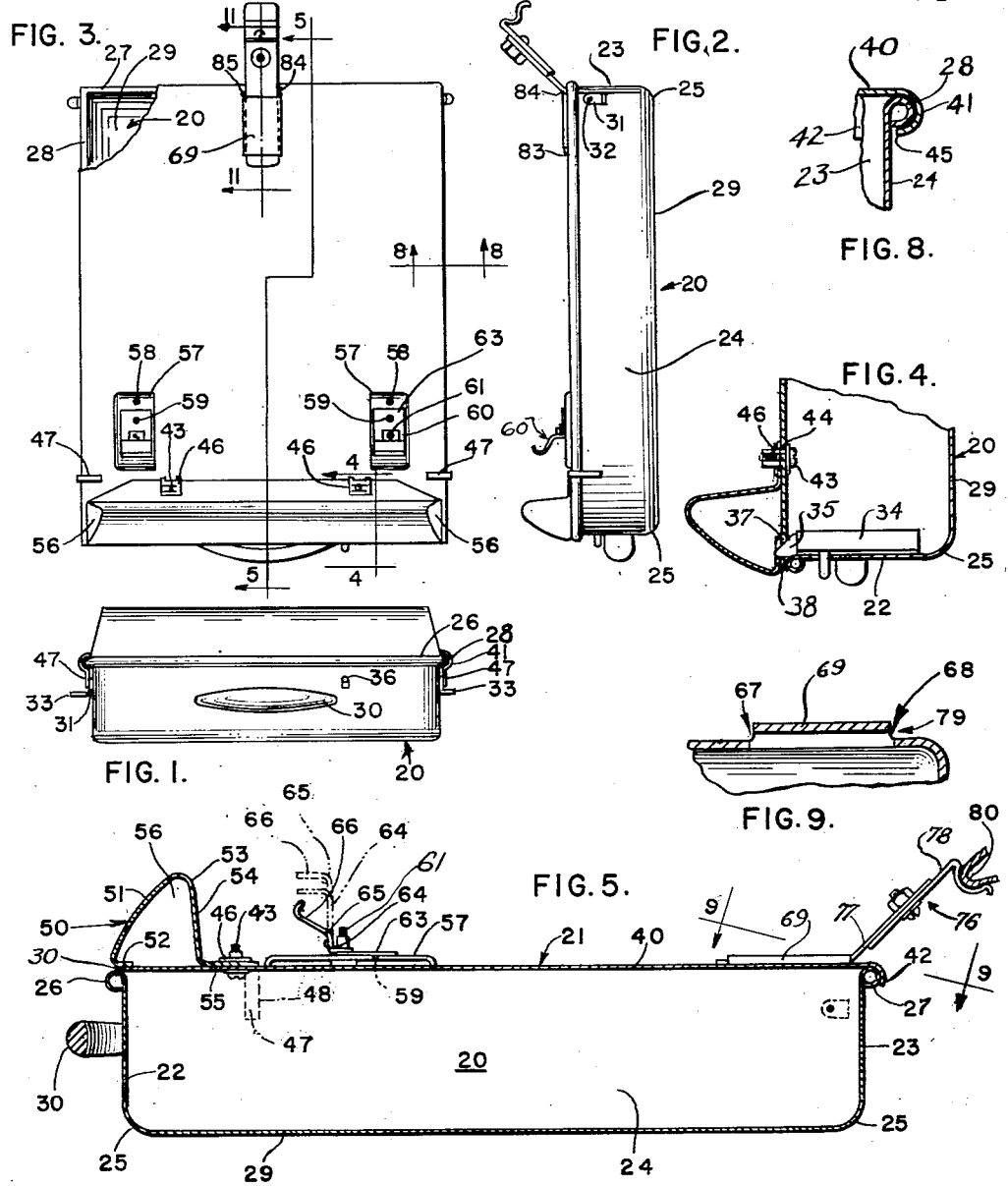
INVENTOR.
ROBERT D. WELLES
BY Pearce & Schaeperklaus
ATTORNEYS March 20, 1962  R. D. WELLES  3,026,141
UNDERSEAT COMPARTMENT
Filed Jan. 9, 1961  2 Sheets-Sheet 2
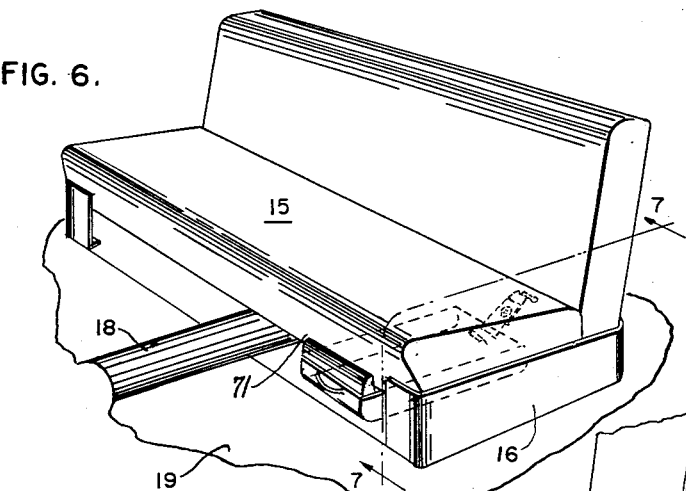
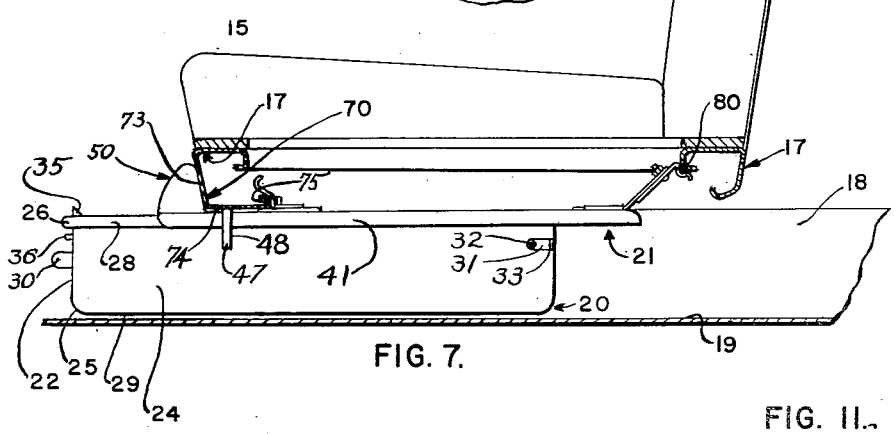
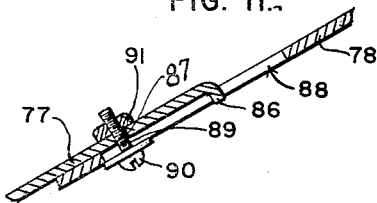
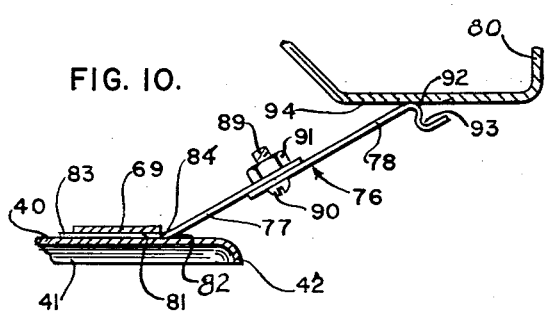
INVENTOR.
ROBERT D. WELLES.
BY Pearce and Schaeperklaus
ATTORNEYS.

United States Patent Office 3,026,141
Patented Mar. 20, 1962

3,026,141
UNDERSEAT COMPARTMENT
Robert D. Welles, Sycamore Township, Hamilton County, Ohio, assignor to Textron, Inc., Providence, R. I., a corporation of Rhode Island
Filed Jan. 9, 1961, Ser. No. 81,501
5 Claims. (Cl. 297—192)

This invention relates to an automobile accessory and more particularly to an underseat compartment for an automobile. This application is a continuation-in-part of my application Serial Number 760,507, filed September 11, 1958, now Patent No. 2,968,341 issued January 17, 1961.

An object of this invention is to provide an underseat compartment for an automobile.

Another object of this invention is to provide an underseat compartment for an automobile which is secured to and supported by the seat frame in such manner that it does not interfere with normal functioning of the seat.

Another object of this invention is to provide an underseat compartment of the above character for safely containing and safeguarding miscellaneous articles.

Another object of this invention is to provide an underseat compartment of the above character which may be quickly and easily secured in place in integral relation with and beneath the front seat of an automobile without modification of the automobile.

Another object of this invention is to provide an underseat compartment of the above character, which so cooperates with the seat frame as to remain in substantially fixed relation thereto when latched closed, even while the automobile travels rough, bumpy or undulating roads which cause it to bounce, pitch, rock, roll or exhibit other undesired non-smooth ride characteristics.

Another object of this invention is to provide an underseat compartment of the above character which, when installed, closed, and locked, is such an integrated part of the automobile as to offer great resistance to pilferage and theft of the contents thereof.

Another object of this invention is to provide an underseat compartment of the above character which, when installed, closed, and locked, can not be removed except by doing substantial physical damage to the accessory or adjacent portions of the automobile, or both.

Another object of this invention is to provide a device of the above character which, when unlocked, may be opened, disassembled, and completely removed from an automobile in which it is installed, without damage to any part of the underseat compartment or automobile.

Another object of this invention is to provide an underseat compartment of the above character which is easily opened and closed, the interior of which is spacious and conveniently accessible.

Another object of this invention is to provide an underseat compartment of the above character having a drawer supporting cover which is substantially flush with the under plane of the seat.

A further object of this invention is to provide an underseat compartment of the above character which may be closed and locked so as to remain safely and securely in place during emergencies and yet having a drawer portion which may be easily opened and also removed for cleaning.

A further object of this invention is to provide an underseat compartment of the above character which is of simple, sturdy construction adapted to give long trouble-free service but which is easily manufactured and saleable at reasonable prices.

A further object of this invention is to provide an underseat compartment of the above character supported on a first portion of a seat frame, said underseat compartment having stabilizing means adapted to simultaneously cooperate with said drawer cover and a second portion of the seat frame spaced from the first portion thereof to prevent angular pivoting of said underseat compartment about said first portion of said seat frame.

A further object of this invention is to provide an underseat compartment comprising a cover having a top bounded by a front edge, a pair of parallel depending side flanges and a depending rear flange, the side flanges being formed to define a pair of opposed grooves, a front support member secured to the top of the cover adjacent the front edge thereof, a bracket secured to the top of said cover in spaced parallel relation to and with its upper extremity extending toward said front support member, and adapted to hang on a first portion of an automobile seat frame to support said cover beneath an automobile seat and said front support in cooperating relation to the frame of said seat to preclude disengagement of said bracket from the frame of said seat and to index said cover in a position in which the flange defined grooves extend lengthwise of the automobile and substantially spaced from the floor thereof, a drawer having outwardly extending sideglide members adapted to be cooperatively received for sliding movement in said flange defined grooves whereby said drawer may be suspended in spaced relation to the floor beneath the seat, the drawer movement control means comprising a lock bolt for preventing drawer movement relative to said cover and drawer movement limiting means determining the normal limits of drawer movement and renderable inoperative to permit disengagement of said drawer from said cover, and cover stabilizing means comprising a base member interlockable with said cover adjacent the rear edge thereof, a reach member adapted to cooperate with said base member and a second portion of the seat frame spaced from the said first portion, securing means securing said reach portion to said base member with the frame engaging portion of said reach member cooperating with said second frame portion, whereby said cover is stabilized against relative pivoting about the first frame member.

The above and other objects and features of this invention will in part be obvious and will in part be apparent to those having ordinary skill in the art to which this invention pertains, from the following description, the accompanying drawings, and the appended claims.

In the drawings:

FIG. 1 is a view in front elevation of an underseat compartment automobile accessory embodying my invention in what presently appears to be a preferred form thereof;

FIG. 2 is a view in side elevation of the device illustrated in FIG. 1;

FIG. 3 is a top plan view of the device illustrated in FIGS. 1 and 2, a portion thereof being broken away to more clearly illustrate details of construction;

FIG. 4 is a fragmentary view in section taken along the line 4—4 in FIG. 3;

FIG. 5 is a fragmentary view in vertical section taken along the line 5—5 in FIG. 3;

FIG. 6 is a view in perspective of an automobile seat to and beneath which a device embodying this invention is secured;

FIG. 7 is a view in side elevation partly in section taken along the line 7—7 in FIG. 6;

FIG. 8 is a fragmentary view in vertical section taken along the line 8—8 in FIG. 3;

FIG. 9 is a fragmentary view in vertical section of a portion of the cover taken along the line 9—9 in FIG. 5;

FIG. 10 is a fragmentary view, partly in section, showing the cooperation of a stabilizing bracket with one type of seat frame; and FIG. 11 is a fragmentary view in section taken along the line 11—11 in FIG. 3.

In the drawings and the following specification, like reference characters indicate like parts.

The embodiment of the invention illustrated in the drawing is adapted to fit in subjacent relation to an automobile seat 15 between the end mounting 16 for the frame 17 of the seat and the tunnel 18, as shown in FIGS. 6 and 7. The underseat compartment accesory comprises a drawer 20 and cover and mounting support therefor 21. The drawer 20 shown in the drawings comprises a substantially rectangular receptacle which may be drawn from a single piece of stock or fabricated by welding or otherwise joining portions of one or a plurality of members to form a single unitary shell. As shown in the drawings, the drawer 20 has a front wall 22, a rear wall 23 and side walls 24. The drawer walls 22, 23 and 24 are substantially rectangular in shape and have substantially cylindrically rolled, outwardly projecting bead-flange-form upper edge portion 26, 27 and 28, in spaced, parallel relation to the plane of drawer bottom 29. The several bottom corners or edges of the drawer 20 are rounded, as at 25.

A drawer handle 30 is secured to the front wall 22 of drawer 20 by any suitable means (not shown). A pair of stop clips 31 are respectively secured to the side walls 24 adjacent rear wall 23 by means such as rivets 32. As shown in the drawings, stop clips 31 comprise angle-shaped members one arm or tab-like portion of which lies in flatwise face-to-face abutment with side wall 24 while stop tab or arm 33 projects perpendicularly from side wall 24. The stop clips 31 are secured snugly against side wall 24 by rivets 32 in order that frictional engagement between the clip and side wall results in substantial frictional resistance to pivoting of the clip 31 with reference to rivet 32. However, the magnitude of frictional resistance is such as will permit manual pivotal manipulation of the clip as will be explained subsequently herein.

The drawer 20 is completed by a lock or latch 34 mounted on wall 22, which latch, as shown most clearly in FIG. 4, may have a spring-biased bolt 35 retractable by actuation of push button 36 or by cam cooperation of bolt 35 with cover 21 adjacent keeper aperture 37. When it is desired that the drawer 20 be lockable, latch 34 may be replaced by a locking latch.

Cover 21 has a substantially rectangular flat top portion 40 of substantially the same size and shape as the open, upper face of drawer 20. A rear flange 42 extends downwardly from cover top portion 40 as does a pair of lateral flanges 41 which curve downwardly and with arcuate section from cover top portion 40. The lateral flanges 41, as shown in FIG. 8, cooperate with the lateral and lower portions of respective bead flanges 28, such that the drawer tends to settle into rattle-free stationary relation to the cover and yet can slide freely relative thereto under hand applied forces. As shown in FIG. 1, flanges 41 are formed symmetrically and define opposed grooves for cooperatively receiving respective bead flanges 28 to substantially preclude lateral movement of drawer 20 with relation to cover 21 and support the drawer 20 in predetermined elevation, in close spaced relation to the cover 21. A pair of stops 47 may each be secured to the exterior face of the cover and a respective one of each of the lateral flanges 41 and extend below the lower edge 45 thereof adjacent but spaced from the front end thereof as shown in FIGS. 1, 2, 3, 5 and 7. The stops 47 have a vertically extending rear edge 48 adapted to cooperate with stop tab portion 33 of clip 31 to establish a predetermined limit for relative movement of drawer 20 relative to cover 21, that is, to the left of the position in which it is shown in FIG. 7, to preclude accidental separation of the drawer 20 from the cover 21. Clips 31 may be swung in a counter-clockwise direction about rivet 32 from a position such as that in which it is shown in FIG. 7 into the position shown in FIG. 2, in which stop tab portion 33 thereof will pass stop 47 incident to removal from or placing of drawer 20 in cooperative relation to cover 21. Thereafter, the clip 31 may be swung to the position in which it is illustrated in FIG. 7, to preclude withdrawal of the drawer 20 from engagement with the cover 21. The edge 48 will cooperate with tab portion 33 of clip 31 to swing the clip into proper alignment, that is, a position corresponding to FIG. 2, when preliminary hand positioning of the clips 31 is inexact.

In order to facilitate mounting of the underseat compartment in cooperative relation to an automobile seat 15, a front support member 50 is provided and secured to cover top portion 40 adjacent the front edge 38 thereof. Front support 50, as shown, comprises an upper forward, rounded portion 51 along the lower extremity of which a rearwardly projecting flange 52 is provided and from the upper extremity of which an upper downwardly and rearwardly sloping portion 53 extends to a lower sharply downwardly and rearwardly sloping portion 54, the lower extremity of which joins flange portion 55. Ends 56 of front support member 50 are secured by any suitable means, such as welding, to the end portions of portions 51, 52, 53 and 54 to strengthen and rigidify front support member 50 and provide a smooth exterior thereto. The front support 50 is secured in fixed relation to top portion 40 of cover 21 by any suitable means, such as screws 43 extending through slots 44 in cover top 40 into cooperative engagement with nuts 46, or the like, serving to secure flange 55 in predetermined, spaced relation to front edge 38 of cover 21 and in flatwise, abutting, fixed relation to top portion 40, as shown in FIGS. 3 and 4. The slots 44 extend perpendicularly to and in spaced relation to front edge 38 and permit limited or fine adjustment of the position of front support member 50 relative to edge 38 and bracket 60, in view of the dimensions of the seat frame 17. Thus, as shown most clearly in FIGS. 6 and 7, front support 50 is so formed that portion 54 thereof lies in face-to-face cooperative abutment with the lower front portion of automobile seat 15, while portion 51 thereof serves to provide a mounted nosing or filler between the seat cushion and the forwardly projecting portion of cover top portion 40.

As shown clearly in FIGS. 2, 3, and 5, brackets 60 are provided and secured in fixed relation to cover top portion 40 by suitable means, such as screws 61 which cooperate with threaded boss portions of bracket 60. Each bracket 60 is a unitary member having a foot flange 63 adapted to be clamped in face-to-face engagement with a raised land portion 57 of top cover portion 40, by screws 61. Brackets 60 are equally spaced from front support 50 as shown in FIG. 3. To permit alteration in the spacing of bracket 60 and front support 50 to compensate for effective frame thickness variations, in the frame, or due to upholstery seat covers or the like, not shown, a plurality of spaced apertures 58, of a size such that the shanks of screws 61 pass therethrough, are provided in land portions 57 along a perpendicular to front edge 38. Each foot flange 63 has an index finger of cross-section substantially duplicating the cross-section of the shanks of screws 61 adapted to project into one of said apertures 58 to preclude pivoting of the bracket 60 about screw 61. The head of screw 61 is received under land portion 57 and does not interfere with movement of drawer 20 beneath cover 21. Riser portion 64 extends integrally upwardly from the forward edge of foot flange 63 to a knee bend 65 from which bend, frame contacting portion 66 extends forwardly.

As shown in FIGS. 2, 3, 5, 6 and 7, a stabilizing bracket 76 is provided, comprising a base member 77 and a reach member 78. A pair of spaced parallel slits 67 and 68 are made in cover top 40, parallel to and adjacent the rear flange 42. The strap-like portion 69 between slits 67, 68 is pressed upwardly to form a tunnel-like aperture extending parallel to the lateral flanges 41.

Stabilizing bracket base member 77 is of broad V-shape in side elevation as shown in FIGS. 2, 3, 5 and 7, and has a root portion 81 adapted to have spaced portions thereof cooperatively rest on cover top 40 at 82 and 83 when the intervening central portion is snugly received in the tunnel-like aperture. As shown in FIG. 2, member 77 may have lugs 84 adapted to cooperate with strap-like portion 69 and establish a limit of advancement of root portion 81 through the tunnel aperture. Said stabilizing bracket base member 77 and cover top 40 may thus be secured in fixed relation to each other. An end tongue or lug 86 is provided adjacent the end of base member 77 remote from root portion 81 thereof. An aperture 87 is provided in base member 77 in spaced relation to tongue 86. A reach member 78 having an elongated slot 88 into which tongue 86 projects, is secured to base member 77 by screw 89, the shank of which extends from head 90 through slot 88 and aperture 87 into threaded engagement with nut or threaded boss 91, as shown in FIG. 11. The effective length of stabilizing bracket 76 may be adjusted while screw 89 is loosened. The diameter of the shank of screw 89 and the width of tongue or lug 86 are substantially equal to the width of slot 88 and thus serve to align reach member 78 and base member 77. Adjacent its free end, reach member 78 is formed to provide a rounded nose portion 92 and a trough-shaped portion 93, respectively adapted to cooperate with the rear rail 80 of a seat frame 17, as shown in FIG. 10 on one hand and in FIGS. 5 and 7 on the other.

Cover 21 may be mounted in cooperative relation to a portion of an automobile seat frame, as shown most clearly in FIGS. 6 and 7. In FIG. 7 a portion of one conventional construction of an automobile seat frame 17 is illustrated. The front bottom rail 70 of the seat frame is a hollow metal member. The seat covering upholstery material 71 extends down the front face 73 of member 70, thence rearwardly along the under face 74 of member 70 and is wrapped up and over the lower, rearwardly projecting flange portion 75 of member 70. The upholstery fabric 71 is usually secured in place by means such as hog rings (not shown) which anchor the fabric to the frame member 70. A plurality of hog rings (not shown) are provided at suitably spaced intervals along the length of the flange portion 75 of frame member 70.

Installation of the underseat compartment illustrated in the drawings may be effected by releasing latch 34 to retract slide bolt 35 from engagement with keeper 37, followed by shifting of drawer 20 to the left of the position in which it is shown relative to cover 21 in FIG. 5. Clip 31 may be swung into the position shown in FIG. 2, in order that the drawer 20 may be completely disengaged from cover 21. The location of brackets 60, with reference to front support member 50, is appropriately altered, if necessary, to establish the coarse adjusted spacing therebetween with reference to the dimensions of seat frame 17, and screws 61 tightened to secure brackets 60 in fixed relation to lands 57. Screws 43 are loosened sufficiently and the front support member 50 is advanced as far forward as slots 44 permit, that is, as far away from brackets 60 as possible, but screws 43 are not loosened enough to permit front support member 50 to move except under substantial applied force. Cover 21 is inserted beneath automobile seat 15 until brackets 60 are rearwardly of frame member 70, that is, to the right of frame member 70 as viewed in FIG. 7. Cover 21 is then successively raised and advanced forwardly, to hook bracket portions 66 over or on top of flange 75 with riser portion 64 firmly abutting the rear edge of flange 75 or the upholstery or hog rings overlying it. Portions 66 are lowered to rest upon the upper surface of the flange 75. With cover 21 held securely in the position in which brackets 60 are in engagement with flange 75 of the front rail 71 of frame 17 as described, front support member 50 may be advanced by striking with the palm of the hand to drive same toward brackets 60 until face 54 thereof is in firm engagement with seat covering upholstery 71 and is substantially flush with cover edge 38. Front support member 50 is secured in this position of adjustment by tightening screws 43. Cover 21 then tends to swing, under gravitational froce, in a clockwise direction, as viewed in FIG. 7 and urges the face of portion 54 to press covering 71 more firmly against forward face 73 of frame 70. Thereafter, the drawer 20 is inserted into cooperative engagement with cover 21 with the bead flanges 28 thereof received in the respective opposed grooves defined by lateral flanges 41 of cover 21 until clips 31 have been advanced to the right of the stop 47 as illustrated in FIG. 7. Thereafter, the clips 31 are shifted into the positions illustrated in full lines in FIG. 7 and the drawer is then moved to closed position in which it is latched by bolt 35, as illustrated in FIG. 4. When latch 34 is in latching or locked condition with bolt 35 cooperatively engaging keeper 37, drawer 20 and cover 21 are secured in unitary relation.

Screw 89 may be loosened and reach member 78 moved relative to base member 77 to alter the effective length of stabilizing bracket 76 and then screw 89 is tightened so that reach portion 78 cooperates with rear bottom rail 80 of seat frame 17, to apply a stressing force urging cover 21 to tend to swing clockwise about front bottom rail 70 to maintain cover 21 in rattle-free relation to frame 17 as viewed in FIG. 7. To effect this condition it may be necessary to arch or bow the stabilizing bracket 76 or alter the angle of bending at 84 to compensate for variations between seat frames. As shown in FIGS. 5 and 7 a portion of rear bottom rail 80 may be received in the trough-shaped portion 93 of the stabilizing bracket 76. Some seat frames have a form of which a fragment is shown in FIG. 10 and rounded nose portion 92 is positioned to press firmly upwardly against the flat underside 94 thereof as shown in FIG. 10.

Stabilizer bracket 76 cooperates with cover 21 and rear bottom rail 80 of the seat frame 17, substantially precluding pivotal or other movements of cover 21 relative to frame 17, as well as the noises and shocks which at times result from such movements.

The dimensions of the cover and drawer are such that the drawer bottom 29 is in close spaced relation to the subjacent automobile floor 19. To disengage the underseat compartment accessory from the seat frame, drawer 20 is disengaged from cover 21 as previously described and screws 89 and 43 are loosened so stabilizing bracket 76 may be telescoped to minimum length and front support member 50 advanced as far forward as slots 44 permit and cover 21 is shifted rearwardly and downwardly to disengaged relation to frame 17. However, when drawer 20 and cover 21 are locked in cooperatively engaged relation, as shown in FIG. 6, screws 43 are inaccessible and the underseat compartment is resistant to detachment from frame member 70. However, if the drawer 20 is first removed, the cover 21 can be removed in the manner above described. Neither attachment nor detachment requires alteration of the automobile structure.

Having thus described the invention, it will be apparent to those having ordinary skill in the art to which this invention pertains, that various changes may be made in the disclosed embodiment, without departing from either the spirit or the scope of the invention.

Therefore, what is claimed as new and desired to be secured by Letters Patent is:

1. An underseat compartment for a seat having a frame, said underseat compartment comprising a cover, hanger means secured to the cover and adapted to cooperatively engage said frame, a front support member secured to said cover and adapted to cooperate with a portion of said frame in opposed relation to said hanger means to limit pivoting of said cover in one direction relative to said frame, a stabilizer bracket coupled to said cover and adapted to cooperate with a portion of said frame intersected by a radius of the axis of cover pivoting and spaced from the portion engaged by said hanger means and front support member to preclude pivoting of said cover from the limit position in which said hanger and front support members cooperate with said frame, and a drawer slideably supported beneath said cover.

2. An underseat compartment for a seat having a frame having at least two non-aligned portions, said underseat compartment comprising a drawer, a drawer supporting cover, hanger means secured to said cover in spaced relation to an edge thereof and adapted to cooperate with a first portion of said seat frame to suspend said cover therebeneath, a front support member mounted on said cover in spaced relation to said hanger means, said front support member being movable to alter its spacing from the hanger means to engage the first portion of said seat frame in opposition to the hanger means, and a stabilizer bracket coupled to said cover and cooperating with the second of said seat frame portions whereby said front support and hanger members cooperate with said first seat frame portion to preclude gravitational pivoting of said cover in one direction about said first frame portion from a predetermined position and said stabilizer bracket and second seat frame portion preclude pivoting of said cover in the opposite direction from said position.

3. In an underseat compartment for a seat having a frame having at least two non-aligned portions, the combination comprising a drawer supporting cover, hanger means secured to said cover in spaced relation to an edge thereof and adapted to cooperate with a first portion of said seat frame to suspend said cover therebeneath, a front support member mounted on said cover in spaced relation to said hanger means, said front support member being movable to alter its spacing from the hanger means to engage the first portion of said seat frame in opposition to the hanger means, and a stabilizer bracket coupled to said cover and cooperating with the second of said seat frame portions whereby said front support and hanger members cooperate with said first seat frame portion to preclude gravitational pivoting of said cover in one direction about said first frame portion from a predetermined position and said stabilizer bracket and second seat frame portion preclude pivoting of said cover in the opposite direction from said position.

4. An underseat compartment comprising a drawer supported by a cooperating cover secured to a seat frame in pivotal relation and gravitationally urged to pivot into one limit position by the unbalanced positioning of the cover with reference to said frame, a stabilizing bracket spaced from said pivotally engaged frame portion and connected in predetermined relation to said cover, said stabilizing bracket being adapted to cooperate with a portion of said seat frame in non-aligned relation to the portion thereof to which said cover is pivotally related, whereby said stabilizing bracket precludes pivotal movement of said cover from said limit position.

5. For an underseat compartment comprising a drawer supported by a cooperating cover secured to a seat frame in pivotal relation and gravitationally urged to pivot into one limit position by the unbalanced positioning of the cover with reference to said frame, said cover having a tunnel forming strap portion spaced from said pivotally engaged frame portion, a stabilizing bracket coupled in predetermined relation to said cover by cooperation with said strap portion, said stabilizing bracket being adapted to cooperate with a portion of said seat frame in non-aligned relation to the portion thereof to which said cover is pivotally related, whereby said stabilizing bracket precludes pivotal movement of said cover from said limit position.

No references cited.